(12) United States Patent
Zhu et al.

(10) Patent No.: US 7,891,475 B2
(45) Date of Patent: Feb. 22, 2011

(54) ISOLATOR DECOUPLER

(75) Inventors: Lin Zhu, Rochester Hills, MI (US);
Marc R. Cadarette, London (CA);
Yahya Hodjat, Oxford, MI (US)

(73) Assignee: The Gates Corporation, Denver, CO (US)

( * ) Notice: Subject to any disclaimer, the term of this patent is extended or adjusted under 35 U.S.C. 154(b) by 485 days.

(21) Appl. No.: 11/977,637

(22) Filed: Oct. 25, 2007

(65) Prior Publication Data
US 2009/0107791 A1 Apr. 30, 2009

(51) Int. Cl.
*F16D 43/21* (2006.01)
*F16D 3/12* (2006.01)

(52) U.S. Cl. ............... 192/54.5; 192/55.3; 192/55.6; 192/55.61; 474/70; 474/94

(58) Field of Classification Search .......... 192/54.5, 192/55.3, 55.61, 55.6
See application file for complete search history.

(56) References Cited

U.S. PATENT DOCUMENTS

| | | | |
|---|---|---|---|
| 2,398,261 A * | 4/1946 | Stone | 192/45 |
| 3,958,679 A | 5/1976 | Tamarin | 192/45 |
| 4,204,589 A | 5/1980 | Loker et al. | 192/27 |
| 4,753,422 A | 6/1988 | Thorn | 267/140.1 |
| 5,722,909 A | 3/1998 | Thomey | 474/87 |
| 6,044,943 A | 4/2000 | Bytzek et al. | |
| 6,059,085 A | 5/2000 | Farnsworth | 192/55.1 |
| 7,153,227 B2 | 12/2006 | Dell et al. | 474/70 |
| 7,207,910 B2 | 4/2007 | Dell et al. | 474/74 |
| 2006/0191519 A1 * | 8/2006 | Bartell et al. | 124/1 |
| 2007/0209899 A1 * | 9/2007 | Liu et al. | 192/55.2 |

FOREIGN PATENT DOCUMENTS

| | | |
|---|---|---|
| EP | 1 279 807 | 1/2003 |
| EP | 1 754 914 A | 2/2007 |
| WO | WO 2004/070225 A | 8/2004 |

* cited by examiner

*Primary Examiner*—Richard M. Lorence
(74) *Attorney, Agent, or Firm*—J. A. Thurnau, Esq.; P. N. Dunlap, Esq.; T. A. Dougherty, Esq.

(57) ABSTRACT

An isolator decoupler comprising a first tapered portion for connecting to a driving shaft, a second tapered portion cooperatively engaging the first tapered portion, the second tapered portion having a frictional engagement with a pulley, and an elastomeric member operatingly disposed between the second tapered portion and the pulley.

6 Claims, 8 Drawing Sheets

ISOLATOR DECOUPLER

FIELD OF THE INVENTION

The invention relates to an isolator decoupler, and more particularly, to an isolator decoupler comprising first and second cooperating tapered members.

BACKGROUND OF THE INVENTION

Diesel engine usage for passenger application is increasing due to the benefit of better fuel economy. Further, gasoline engines are increasing compression ratios to improve the fuel efficiency. As a result, diesel and gasoline engine accessory drive systems have to overcome the vibrations of greater magnitude from crankshafts due to above mentioned changes in engines.

With increased crankshaft vibration in addition to high acceleration/deceleration rates and high alternator inertia the engine accessory drive system is often experiencing belt chirp noise due to belt slip. This will also reduce the belt operating life.

Crankshaft isolators and alternator decoupler/isolators have been widely used for engines with high angular vibration to filter out vibration in engine operation speed range. However, although a crankshaft isolator can function very well in engine running speed range; it still presents problems during engine start up or shut down due to the natural frequency of the isolator itself.

An alternator decoupler/isolator can eliminate the belt slipping issue at an alternator pulley, but it can not resolve belt slip taking place at the crankshaft pulley. For some engines, both a crankshaft isolator and alternator decoupler/isolator have to be used together. Unfortunately, this adds to the cost of the accessory drive system significantly and often vehicle manufacturers are not willing to pay for it.

Representative of the art is U.S. Pat. No. 6,044,943 which discloses a crankshaft decoupler having a mounting hub, a pulley rotatably mounted on the mounting hub, an annular carrier mounted within said pulley, a biasing device mounted therebetween, and a one way clutch mounted between the annular carrier and the pulley. The biasing device cushions the belt drive from crankshaft impulses and lowers the angular resonant frequency of the belt system. The one way clutch prevents sudden reversal of the belt tension in the drive due to start/stop of the engine or sudden deceleration of the engine and prevents momentary reverse slip belt squeal as a result of the tensioners' inadequate output for the reverse mode. The one way clutch limits the maximum amount of torque which may be transmitted preventing belt slippage during momentary overload.

What is needed is an isolator decoupler comprising first and second cooperating tapered members. The present invention meets this need.

SUMMARY OF THE INVENTION

The primary aspect of the invention is to provide an isolator decoupler comprising first and second cooperating tapered members.

Other aspects of the invention will be pointed out or made obvious by the following description of the invention and the accompanying drawings.

The invention comprises an isolator decoupler comprising a first tapered portion for connecting to a driving shaft, a second tapered portion cooperatively engaging the first tapered portion, the second tapered portion having a frictional engagement with a pulley, and an elastomeric member operatingly disposed between the second tapered portion and the pulley.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
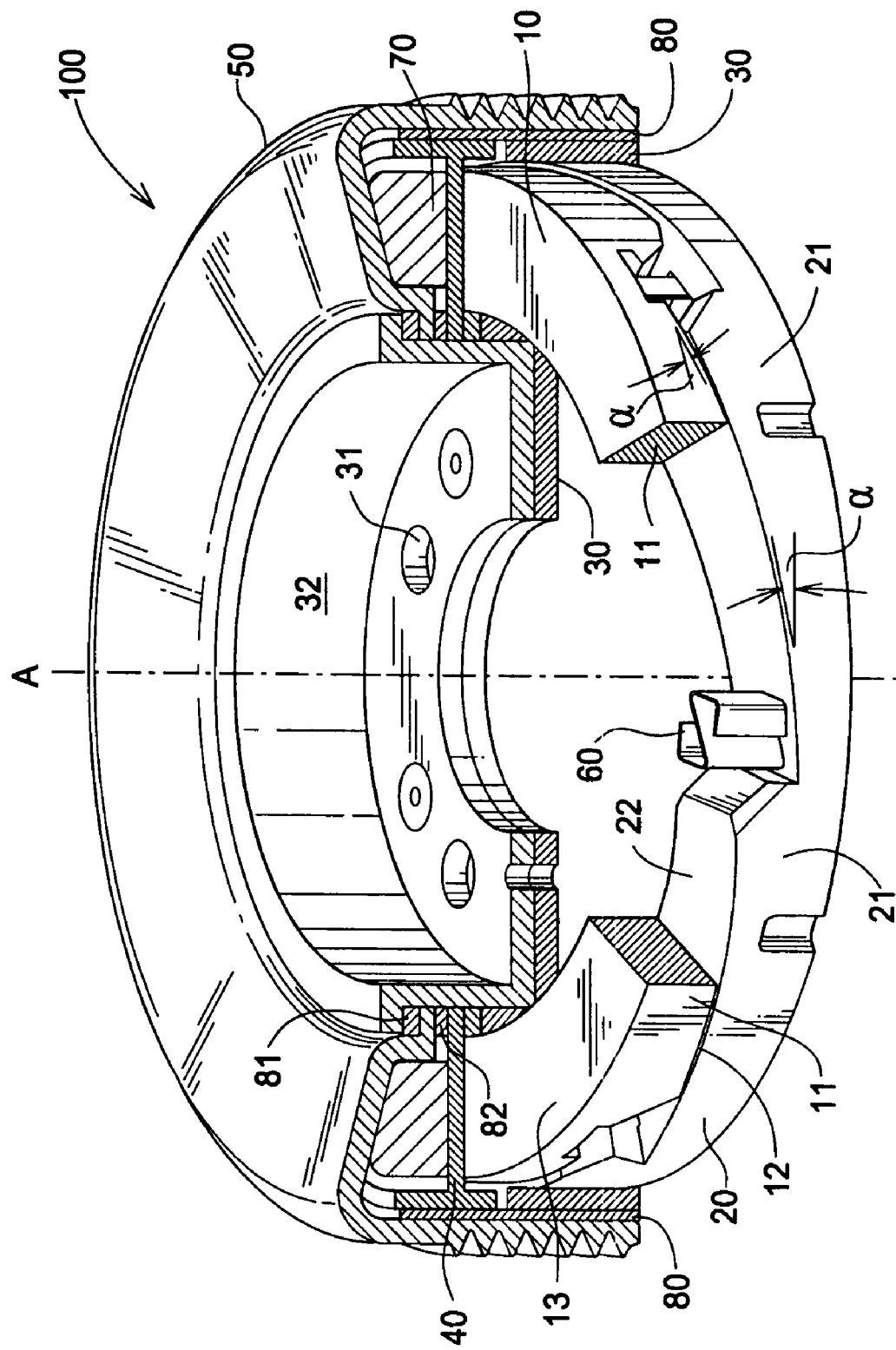
FIG. 1 is a cut away perspective view of the isolator decoupler.

FIG. 1 is a cut away perspective view of the isolator decoupler. The isolator decoupler eliminates belt slip due to engine deceleration and also filters out reverse vibration during engine start up/shut down.

Isolator decoupler 100 comprises a compact design. The components of the isolator decoupler are contained within the pulley 50. Wedge disk 10 is cooperatively engaged with wedge disk 20. Wedge disk 20 is attached to a hub 30.

Wedge disk 10 comprises a plurality of tapered portions 11 which are disposed about the circumference of disk 10. Each tapered portion 11 cooperatively engages a tapered portion 21 of wedge disk 20. Each tapered portion extends along an axis of rotation A-A having an included angle $\alpha$. The number of tapered portions 11, 21 and the angle $\alpha$ of each tapered portion is selected based on the torque load requirements of the accessory drive and disengagement response time. Angle $\alpha$ is determined with reference to a normal plane which extends normal to an axis of rotation. Angle $\alpha$ is situated normal to the normal plane. The normal plane is substantially parallel to surface 13.

Springs 60 are disposed between each wedge disk 10 and wedge disk 20. Springs 60 are used to resiliently maintain a predetermined relationship between wedge disk 10 and wedge disk 20, namely, keeping wedge disk 10 in contact with isolator plate 40. The spring shape or number of springs can be varied as well depending upon the operating requirements, for example using leaf springs, rubber members, coil springs and so on.

Wedge disk 10 can comprise plastic material, or plastic combined with metal, or any other suitable molding material having like strength. Wedge disk 20 can comprise stamped sheet metal, cast iron, flow formed aluminum, plastic or similar material.

Wedge surfaces 12, 22 are in sliding contact with each other. Each wedge surface 12, 22 comprise a very low coefficient of friction (COF) of less than approximately 0.2 to facilitate ease of relative movement. On the other hand, surface 13 is coated or molded with a high COF material in the range of approximately 0.5 to approximately 3.0. Surface 13 is made of a durable material such as metal or plastic.

Wedge disk surface 13 is slidingly engaged with isolator plate 40. Disposed between isolator plate 40 and pulley 50 is a resilient spring member 70. Spring member 70 is attached to pulley 50 and isolator plate 40. Spring member 70 comprises either natural rubber or synthetic polymers or a metal spring, each known in the art, or a combination of two or more of the foregoing. Spring member 70 isolates and absorbs crankshaft pulses that would otherwise be transmitted to the pulley and thereby to the belt driven accessories (not shown).

Hub 30 is connected to an engine crankshaft (not shown) using fasteners such as bolts (not shown) through holes 31. Hub 30 can be press fit to engage hub member 32.

The following table illustrates an example design:

Number of tapered portions (11, 21): 4

Wedge Angle (α): 25°

Spring Rate: 3 to 10 N/mm

Number of Springs (60): 4

Torque Load Requirement: 100 Nm

Wedge Disk Disengagement Response Time: <0.1 second

On engine start-up as the crankshaft turns wedge disk 20 in the engine rotation direction wedge disk 10 is pushed toward isolator plate 40 by interaction of the tapered portions 11, 21. Wedge disk 10 drives pulley 50 through friction force imparted to the isolator plate 40 and thereby through elastomeric member 70 to pulley 50. Pulley 50 then drives the engine accessory system through a belt engaged with surface 51, see FIG. 2.

During engine deceleration or engine shut down, pulley 50 will be driven in the reverse direction by the momentum of the belt drive system through the belt. Wedge disk 10 and wedge disk 20 move axially toward each as tapered portions 11, 21 slide together. Relative axial movement of wedge disk 10 with respect to wedge disk 20 causes surface 13 to disengage from isolator plate 40, thereby temporarily disengaging the pulley from the crankshaft. This instantaneous reversal of torque flow direction allows the pulley to temporarily overrun the crankshaft rotation. Springs 60 allow for a soft engagement between wedge disk 10 and isolator plate 40 during reverse running or stop events.

Figure 2:
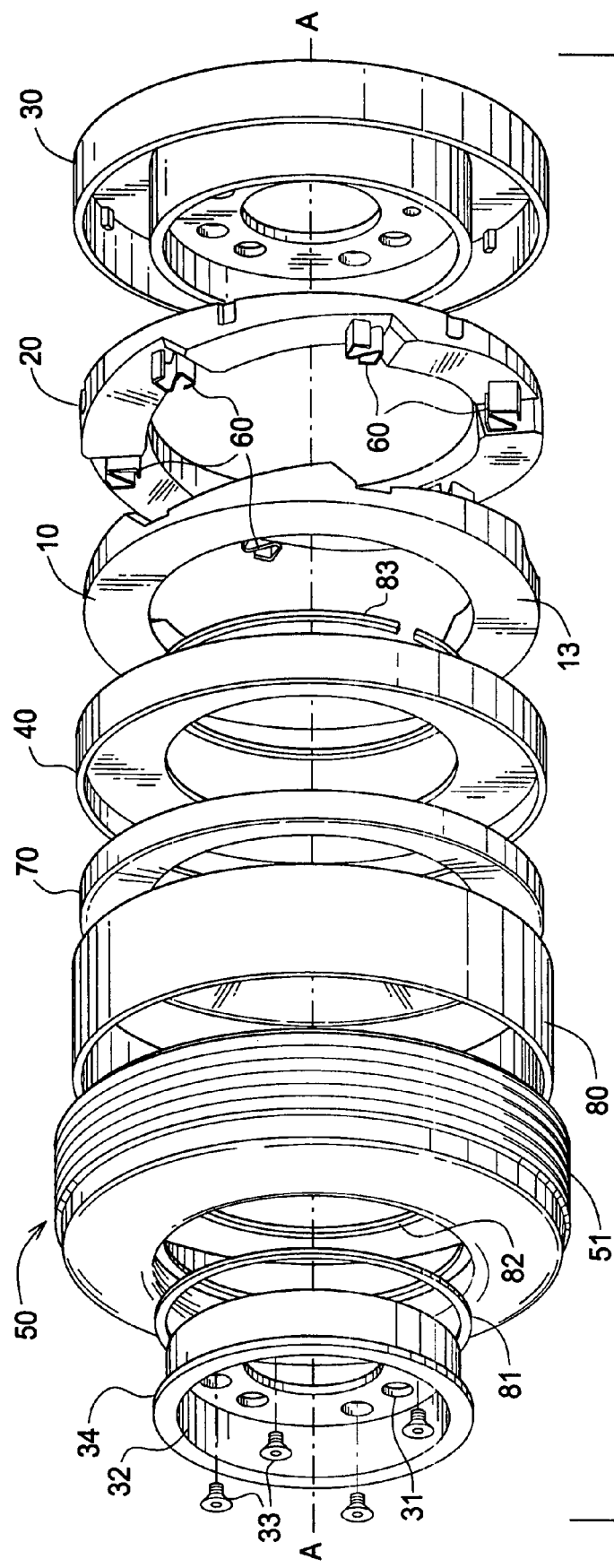
FIG. 2 is a front exploded view of the isolator decoupler in FIG. 1.

FIG. 2 is a front exploded view of the isolator in FIG. 11. Wedge disk 20 is nested within hub 30. Wedge disk 10 is cooperatively engaged with wedge disk 20. Springs 60 are disposed at an end of each tapered portion 11, 21, between each wedge disk 10, 20.

Surface 13 is frictionally engaged with isolator plate 40. Spring member 70 is attached to isolator plate 40 and to pulley 50. A low friction bushing 80 is disposed between hub 30 and pulley 50 to hold alignment and to allow relative instantaneous movement between them. Pulley 50 has a surface 51 suitable for engaging a belt (not shown).

Hub member 32 is attached to hub 30 using fasteners 33, or by other suitable means such as staking, welding or riveting. Rim 34 of member 32 captures pulley 50, bushing 80, elastomeric member 70, isolator plate 40, bushing 82, wedge disk 20, wedge disk 10 between member 32 and hub 30. A low friction bushing 81 is disposed between member 32 and pulley 50 to hold alignment and to allow relative movement between them. Bushing 82 is disposed between pulley 50 and isolator plate 40 to hold alignment and to allow relative movement between them. Bushing 83 is disposed between isolator plate 40 and hub 30 to hold alignment and to allow relative movement between them. The bushings may comprise any low friction bushing or bearing suitable for the service.

Figure 3:
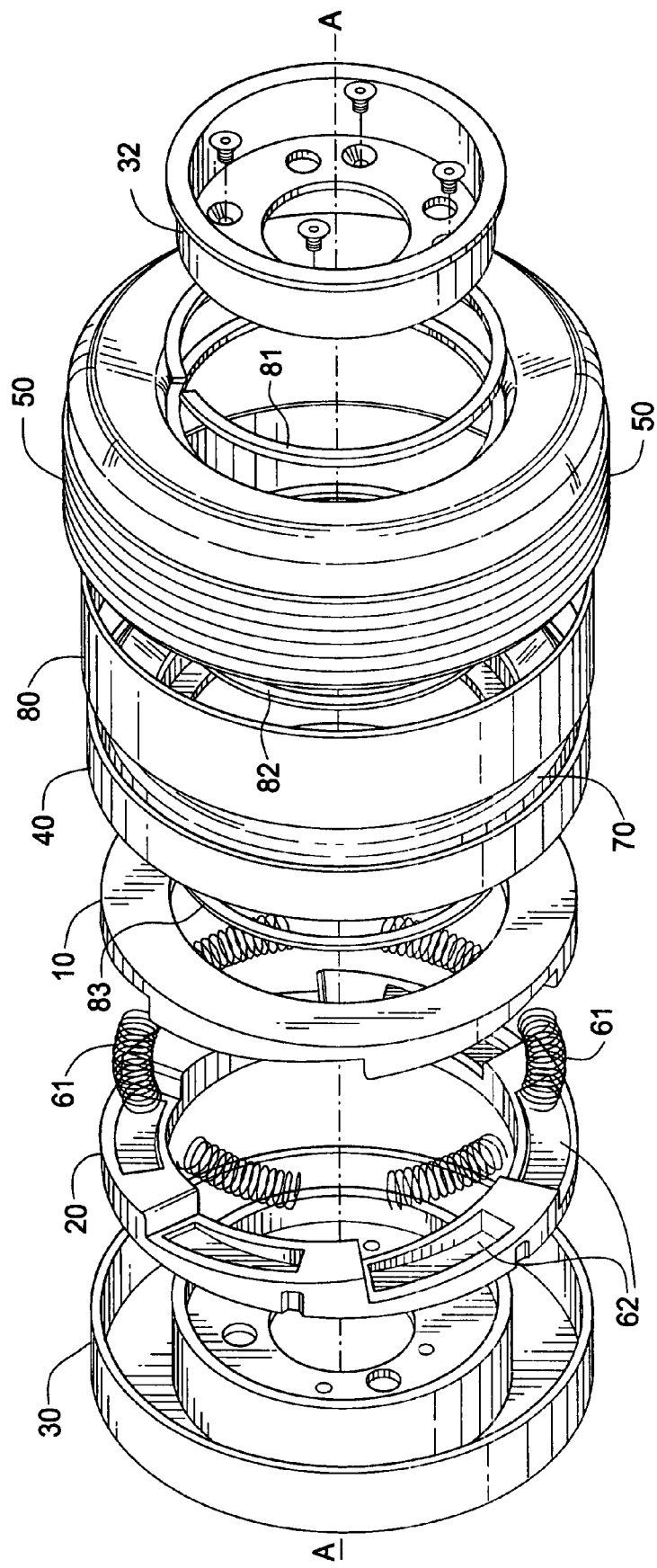
FIG. 3 is an exploded view of an alternate embodiment.

FIG. 3 is an exploded view of an alternate embodiment. The components in this alternate embodiment are as described for FIGS. 1 and 2 with the exception of springs 61. In this embodiment each spring 61 comprises a coil spring which is compressed between the wedge disk 10 and wedge disk 20 during operation. Recesses 62 receive each spring 61.

Figure 4:
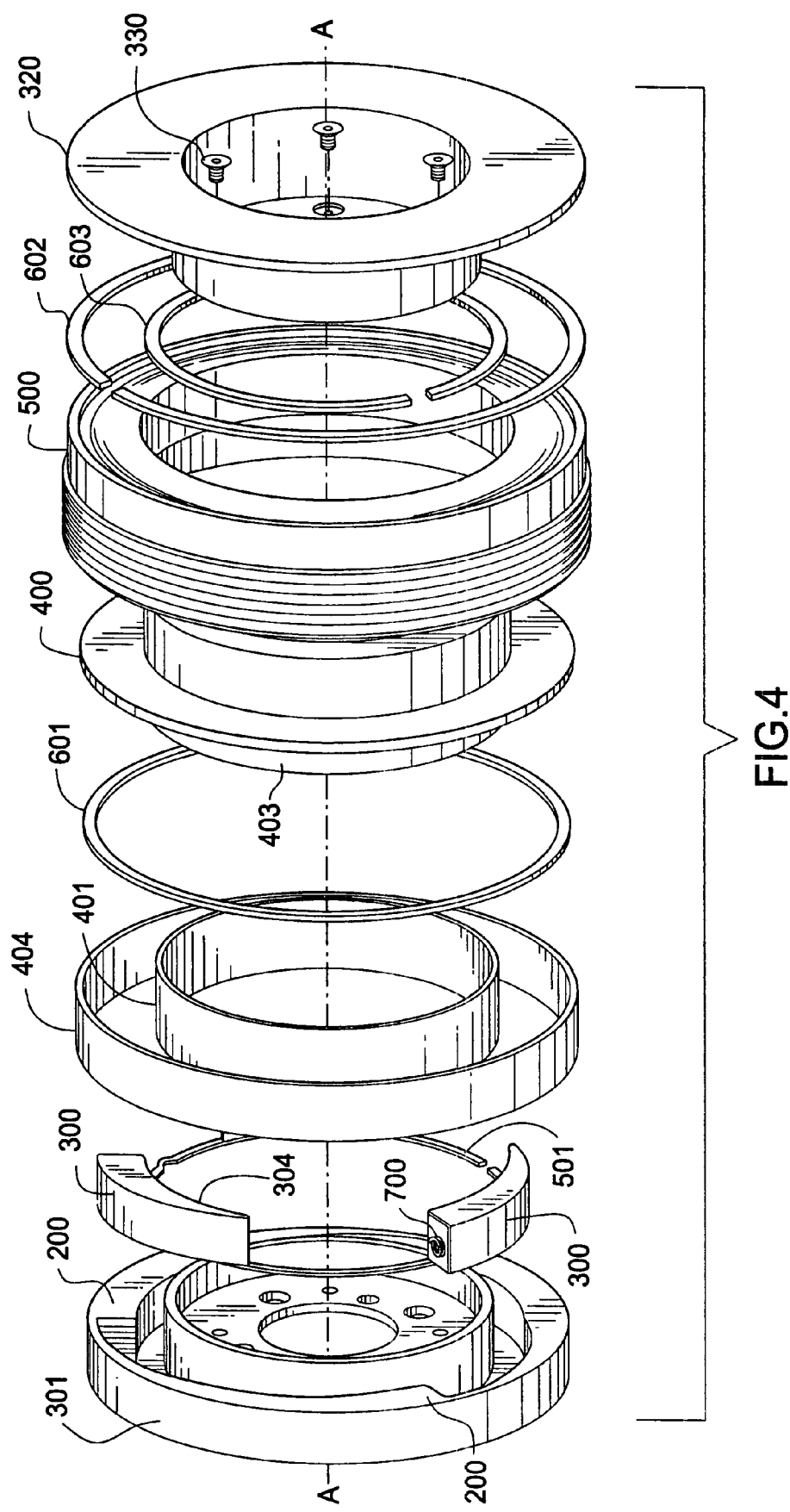
FIG. 4 is an exploded view of yet another alternate embodiment.

FIG. 4 is an exploded view of yet another alternate embodiment. In this alternate embodiment wedge disk 10 and wedge disk 20 are replaced with cooperating wedge circular portions 200 and 300. Each wedge circular portion 200, 300 has a tapered shape. Disposed between each wedge circular portion 200, 300 is a spring 700. Each spring 700 bears upon a portion 200 and urges each portion 300 into contact with a hub plate surface 403.

Each wedge portion comprises an angle (α). Angle α is situated parallel to a plane which extends normal to an axis of rotation A-A. Hub portion 320 is attached to hub 301 using fasteners 330. Elastomeric member 402 is attached to pulley 500 and to hub plate 400. Bushing 401 is disposed between hub plate 400 and hub portion 301. Bushing 404 is disposed between hub portion 301 and pulley 500. Bushings 601, 602 and 603 are each low friction to allow relative movement between adjacent components.

Each wedge surface 304 is coated or molded in with a high COF in the range of approximately 0.5 to approximately 3.0 and made of durable material such as metal or plastic. The number of wedge portions 200, 300 and the angle α of each portion is selected based on the torque load requirements of the accessory drive and disengagement response time. The surface of each wedge portion 200, 300 each have a coefficient of friction of less than approximately 0.2.

Wedge circular portions 200 are fixedly attached to and/or form a part of hub 301. Portions 300 are not attached to hub 301. Each portion 300 "floats" between and is constrained by each adjacent portion 200 and surface 403. With the wedge circular portions, a frictional driving force is generated between surface 304 of portion 300 and outer diameter surface 401 as a result of the relative movement (wedging) between portion 200 and portion 300. As a result of movement of portion 200 with respect to portion 300 caused by rotation of hub 301, portion 300 is pressed radially inward upon surface 403 of the isolator to transfer the torque from the hub 301, through portions 300 to the isolator plate 400. Torque is then transmitted through elastomeric member 402 and thereby to pulley 500 during normal, non-accelerating running condition. Pulley 500 drives a belt (not shown).

During engine deceleration, which is also the overrunning state, wedge portion 300 moves relative to portion 200 to disengage portion 300 from the surface 403. This releases the frictional force between portion 300 and surface 403, thereby allowing isolator to decouple the belt from the crankshaft and thereby to overrun the crankshaft during deceleration (shutdown) or start up.

Figure 5:
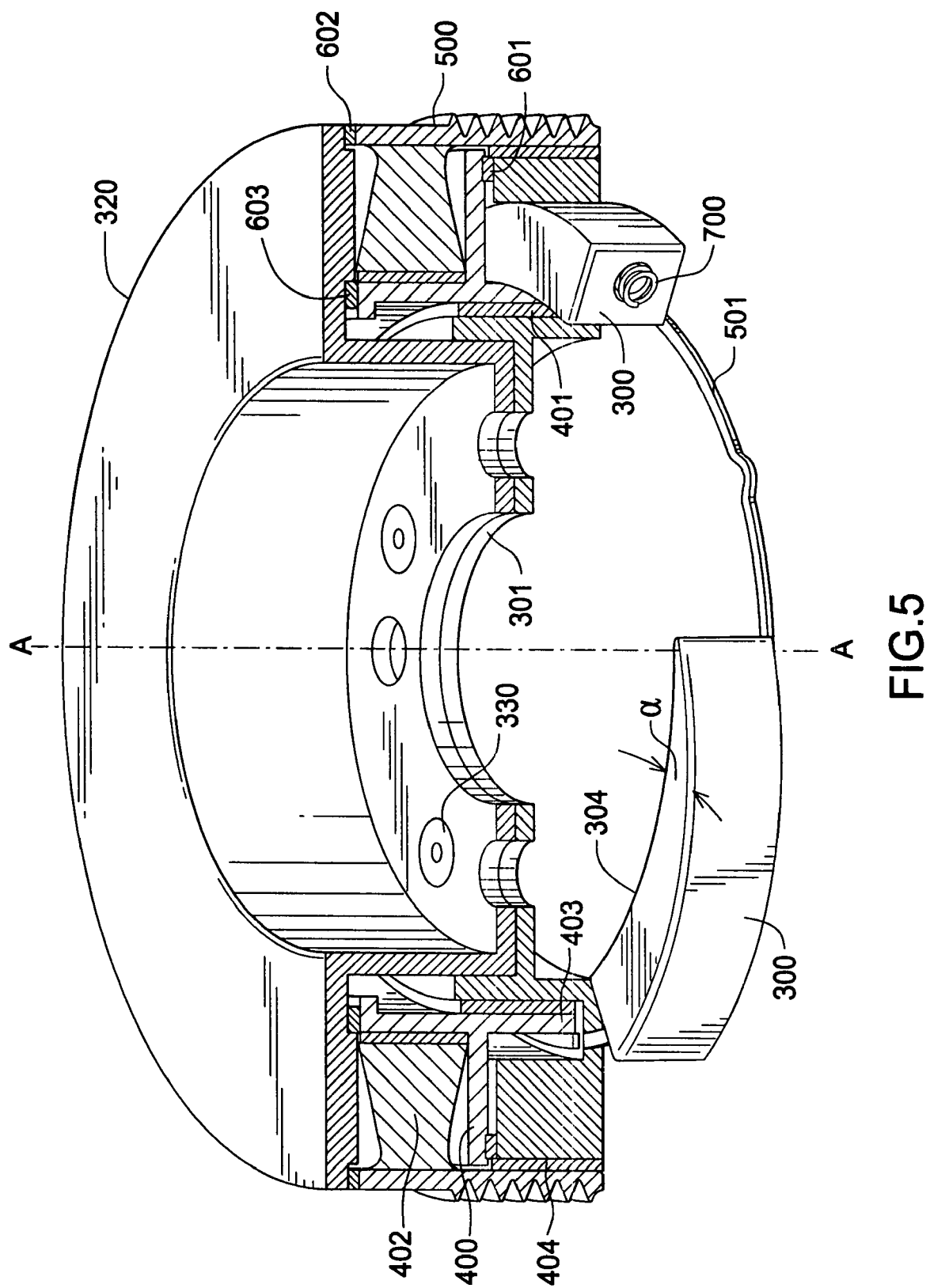
FIG. 5 is a cut away cross section of the embodiment in FIG. 4.

FIG. 5 is a cut away cross section of the embodiment in FIG. 4. Hub portion 301 is omitted from this figure for reasons of clarity. Spring member 501 holds each wedge portion 300 away from hub portion 301. Since hub portion 301 has some small amount of relative movement with respect to the wedge members 300, the spacing effect of spring member 501 prevents undue rubbing, wear, frictional heating and damping between wedge members 300 and hub portion 301.

Figure 6:
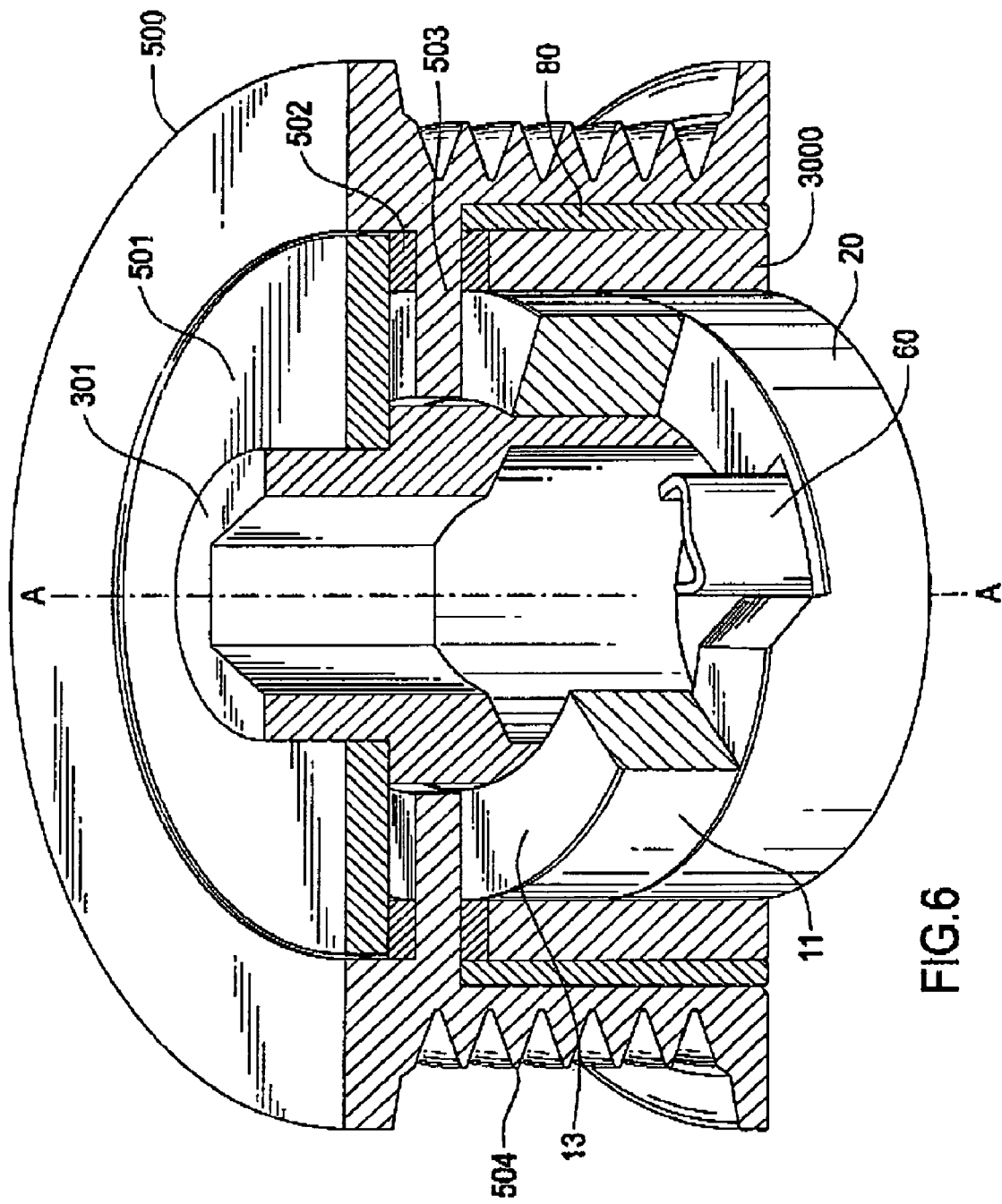
FIG. 6 is a cut away perspective view of an alternate embodiment.

FIG. 6 is a cut away perspective view of an alternate embodiment. In this alternate embodiment, the resilient spring member 70 is not used. The components in this alternate embodiment are as described in FIGS. 1 through 5 except as specifically provided for in this FIG. 6.

A low friction bushing 502 is disposed between flange 501 and pulley flange 503. Flange 501 is fixedly connected to end 301 of hub 3000, for example, by a press fit. Wedge disk 20 is fixedly engaged within hub 3000. Wedge disk 20 does not rotate with respect to hub 3000. Tapered portions 11 and wedge disk 20 operate as described in FIGS. 1 through 5. Surface 13 of tapered portions 11 frictionally engage wedge disk 20 and flange 503. Belt engaging surface 504 is for engaging a belt (not shown).

Figure 7:
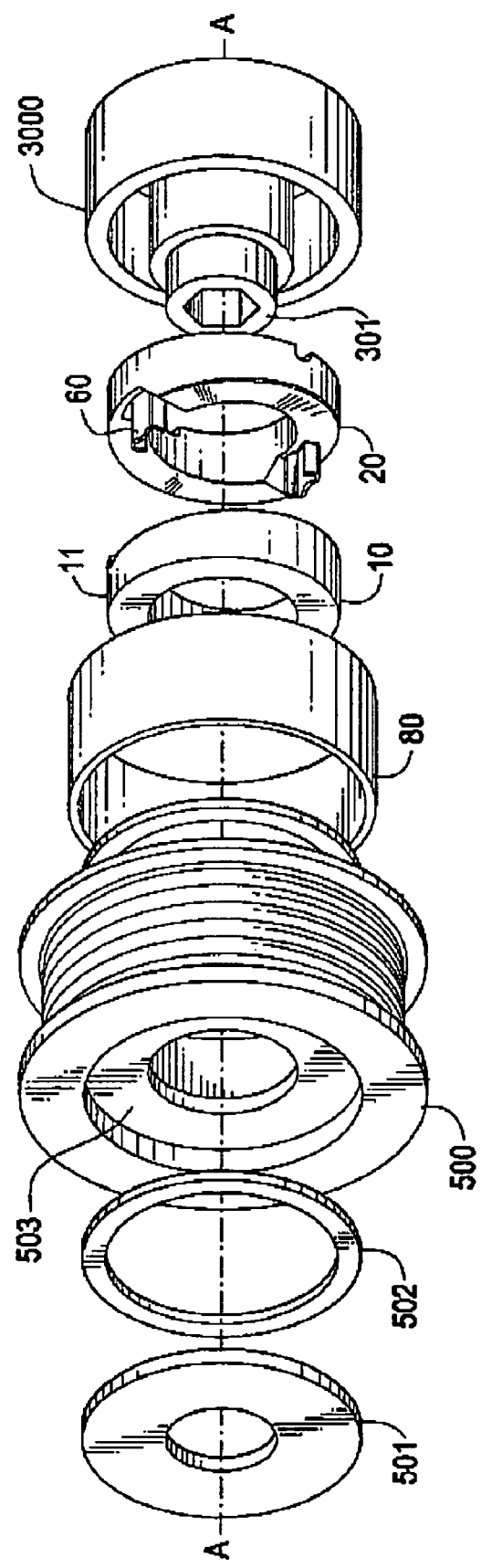
FIG. 7 is a exploded view of the alternate embodiment in FIG. 6.

FIG. 7 is an exploded view of the alternate embodiment in FIG. 6. Hub 3000 is fixedly attached to a shaft, such as an alternator shaft (not shown). Wedge disk 20 rotates with hub 3000. Wedge disk 10 and wedge disk 20 and tapered portions 11 operate as described for FIGS. 1-5.

Figure 8:
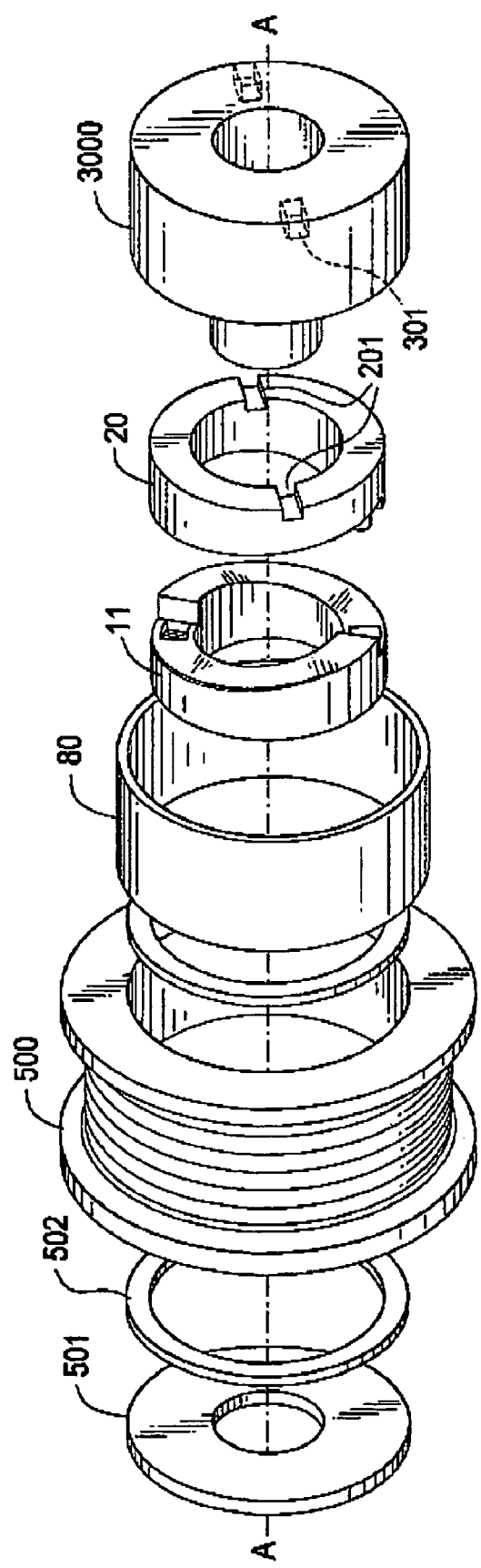
FIG. 8 is a perspective view of the alternate embodiment in FIG. 6.

FIG. 8 is a perspective view of the alternate embodiment in FIG. 6. Notches 201 engage cooperating tabs 301 in hub 3000, which assures that wedge disk 20 fixedly rotates with hub 3000.

Although forms of the invention have been described herein, it will be obvious to those skilled in the art that variations may be made in the construction and relation of parts without departing from the spirit and scope of the invention described herein.

We claim:

1. An isolator decoupler comprising:
a first wedge disk (10) having a first tapered portion (11);
a second wedge disk (20) having a second tapered portion (21) cooperatively engaging the first tapered portion, the second wedge disk attached to a first hub member (30);
the first wedge disk normally having a frictional engagement with a plate member (40), the first wedge disk disengaging the plate member upon relative axial movement of the first wedge disk toward the second wedge disk;
a spring (60) disposed between the first wedge disk and the second wedge disk; and
an elastomeric member (70) operatingly disposed between the second wedge disk and a pulley (50).

2. The isolator decoupler as in claim 1, wherein the spring comprises a coil spring.

3. The isolator decoupler as in claim 1, wherein the first tapered portion is situated at an angle $\alpha$ relative to a plane which extends normal to an axis of rotation (A-A).

4. The isolator decoupler as in claim 1, wherein the first tapered portion, the second tapered portion and the elastomeric member are contained within the pulley.

5. The isolator decoupler as in claim 1 further comprising a second hub member attached to the first hub member.

6. An isolator decoupler comprising:
a first wedge disk (10) having a first tapered portion (11);
a second wedge disk (20) having a second tapered portion (21), the second wedge disk attached to a first hub member (30);
the first tapered portion is situated at an angle $\alpha$ relative to a plane which extends normal to an axis of rotation (A-A);
the second tapered portion cooperatively engaging the first tapered portion;
a spring (60) disposed between the first wedge disk and the second wedge disk, the first wedge disk disengaging the plate member upon relative axial movement of the first wedge disk toward the second wedge disk; and
the first wedge disk normally having a frictional engagement with a plate member (40) and contained within a pulley (50).

* * * * *